United States Patent [19]

Pei

[11] 4,048,982
[45] Sept. 20, 1977

[54] BULB-TYPE SOLAR ENERGY COLLECTOR

[75] Inventor: Yu Kun Pei, Toledo, Ohio

[73] Assignee: Owens-Illinois, Inc., Toledo, Ohio

[21] Appl. No.: 682,816

[22] Filed: May 3, 1976

[51] Int. Cl.$^2$ ............................................... F24J 3/02
[52] U.S. Cl. .................................. 126/271; 165/142; 350/293; 350/299
[58] Field of Search .............. 126/270, 271; 237/1 A; 350/293, 299; 240/41 SB, 41 L, 41.3, 41.5, 7.1 R; 165/166, 142

[56] References Cited
U.S. PATENT DOCUMENTS

| 761,596 | 5/1904 | Moss ..................................... | 126/271 |
| 1,424,932 | 8/1922 | Moreau ................................. | 126/271 |
| 1,575,309 | 3/1926 | Anderson ............................. | 126/271 |
| 1,696,003 | 12/1928 | Harvey ................................. | 126/271 |
| 3,952,724 | 4/1976 | Pei ........................................ | 126/271 |

Primary Examiner—Kenneth W. Sprague
Assistant Examiner—James C. Yeung
Attorney, Agent, or Firm—J. R. Nelson

[57] ABSTRACT

The disclosure relates to a bulb-type solar energy collector device comprising a hollow glass body shaped with a parabolic interior surface that is coated with specular finish of a metal, e.g. silver, and includes an apex aperture and integral hollow yoke. A hollow glass, bulb-shaped absorber element is exteriorly coated with a wave length selective coating. The bulb-shaped element includes a tubular hollow stem dependent from the bulbar portion and fixed in the yoke of the glass body so that the central axis of the stem and bulbar end portion is along the focal axis of the parabolic reflecting surface. A cover plate is sealed over the enlarged end of the reflecting surface enclosing the interior mirror surface in a chamber which is evacuated to substantial vacuum, e.g. $10^{-4}$ torr or greater vacuum. A working media is circulated from a source in a manifold through the interior volume of the absorber element to remove the solar energy absorbed thereby as heat and the media is returned to the manifold. The solar energy laden media is available for heating, cooling or power generating uses.

12 Claims, 3 Drawing Figures

BULB-TYPE SOLAR ENERGY COLLECTOR

The present invention relates to an apparatus for collecting radiant energy from the sun and supplying that energy in the form of heat for use in other apparatus for heating, cooling or other useful work applications.

The apparatus of the present invention employs a bulb-type radiant energy collector comprised of three principal structural parts fabricated basically of glass.

In my copending applications Ser. Nos. 682,705 and 682,817, both filed May 3, 1976, a bulb-type solar energy collector is disclosed in which a molded glass body includes a parabolic interior wall surface which includes a hollow tubular end extension centered on the axis of the parabolic wall. A hollow tubular wall absorber element closed at the one end and open at the other end is fixed into place along the central axis of the parabolic wall. A transparent cover plate closes the space within the parabolic wall of the body, and the space is evacuated to a high vacuum. The absorber is coated on the exterior surface with an energy absorbing material.

SUMMARY OF THE INVENTION

In the present construction, the bulb-type collector is fabricated of glass parts and a special absorber element of enlarged surface area is utilized within the vacuum space of the parabolic walled reflector. The absorber element is a blown glass bulbar shape having a hollow dependent cylindrical or hollow stem. The bulbiferous portion of the element is preferably substantially spherical in shape, which provides the maximum surface area for a bulbous collector and maximum strength. The strength factor is significant because the absorber element will be exposed to the vacuum pressure differential. One (outer) surface of the absorber will be at vacuum pressure conditions while the opposite (inner) surface will be at approximately atmospheric or greater pressure.

The exterior surface area of the bulbiferous portion of the absorber element is provided with an opaque coating layer of a solar energy absorbing material of a type herein disclosed to absorb the solar energy focused thereon by the parabolic wall surface. The parabolic wall is mirrored by a specular coating of a metal compound, such as silver. The solar radiation striking the parabolic reflector is focused to the axis and onto the absorber surface.

If the collector apparatus is mounted stationary at a mean solar exposure, or is employed with some device for tracking of the sun, the absorber element of this invention will operate with efficiency.

The collector of the present invention being constructed of glass parts, may be manufactured and assembled by utilizing known equipment, such as glass forming equipment suitable for pressing, blowing or centrifugally molding glass articles. As indicated in my aforementioned applications, the collector may be shaped exteriorly into interfitting or interlocking assemblies to construct a curtain wall surface made weather resistant and situated on a favorable solar exposure of a building, viz the roof or a wall surface thereof.

A significant feature of the invention is the means in the structure by which radiation losses are reduced. This is accomplished by a wave length selective coating on the absorber surface and by keeping the exposed surface area of the absorber member relatively small in relation to the larger surface area of the parabolic reflector.

The bulb collectors are assembled onto a manifold apparatus by inserting an outwardly depending hollow yoke thereof into an aperture formed in the manifold. In one form of the invention, the yoke is sealed in the manifold aperture by rubber ring gasket or ring grommet seals.

The fluid from the manifold is circulated into the absorber bulb and back into the manifold through the stem portion thereof by fluid handling means extending into the absorber. Circulation of the working fluid through each of the bulb absorbers of the collectors continuously removes the heat energy of the solar radiation collected on the energy absorption surface of the absorber element. The solar radiation is focused onto the surface of the absorber member by the mirrored specular parabolic surface at the interior of the bulb body. Relatively high temperatures may be developed in the working fluid by the apparatus of this invention.

Other advantages of the invention will be more readily apparent to those skilled in the art from the following detailed description of the drawings, on which:

DESCRIPTION OF THE INVENTION

Figure 1:
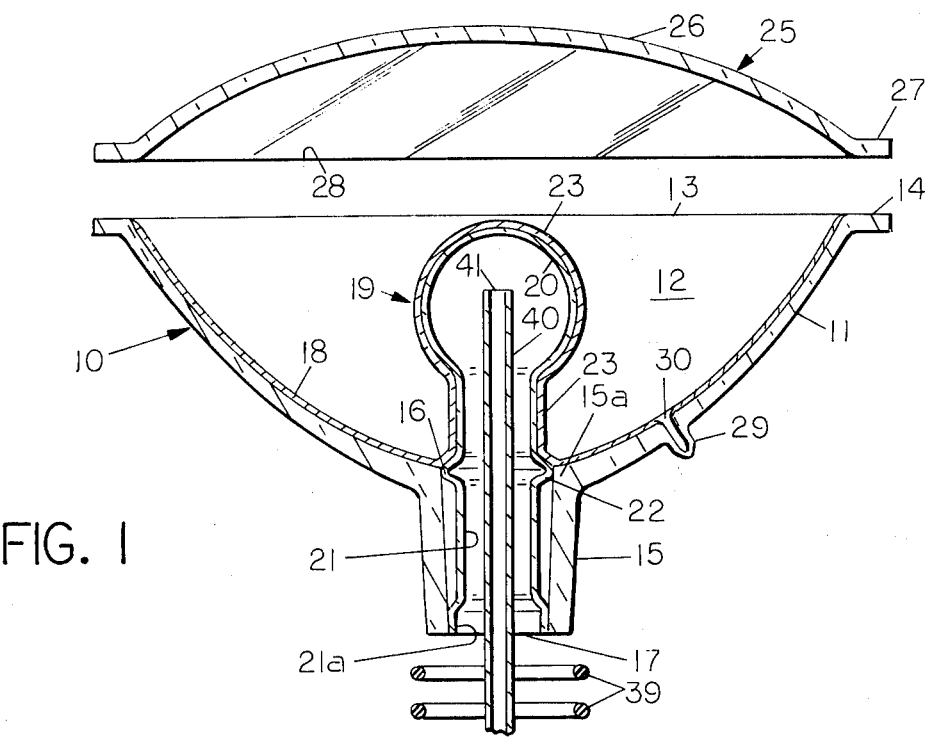
FIG. 1 is an exploded sectional elevational view taken along line 1—1 on FIG. 2., showing the collector apparatus of the invention.
Figure 2:
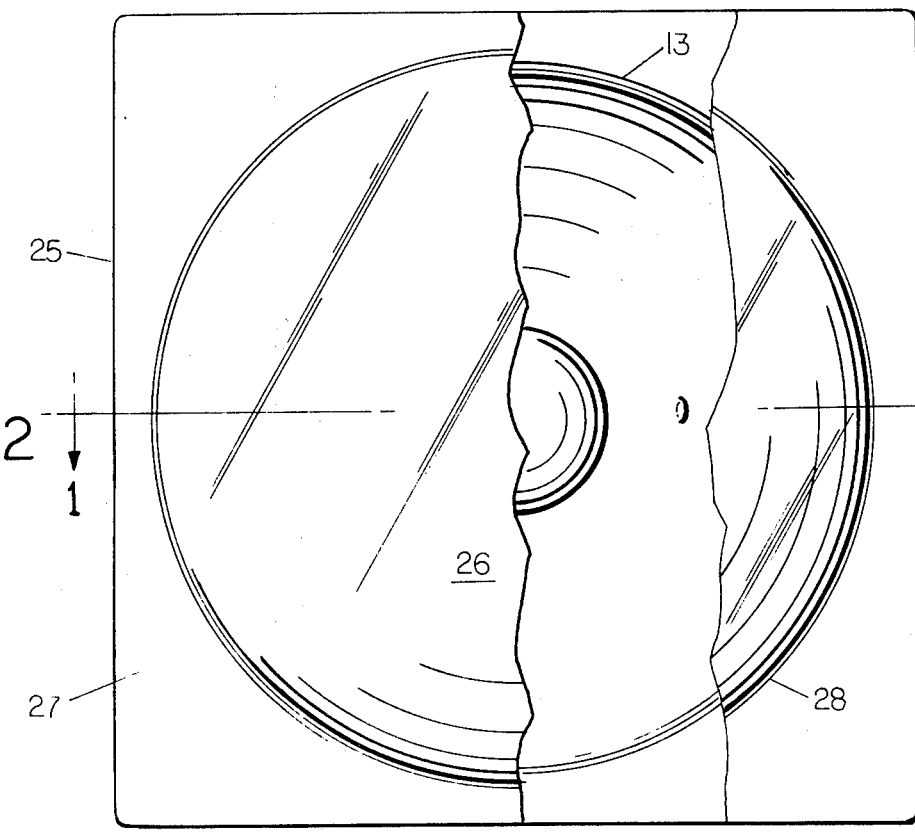
FIG. 2 is a top plan view, with parts broken away, of the apparatus of FIG. 1.

Referring to FIGS. 1 and 2, a bulb body 10 is molded, such as by pressing, centrifugal casting or pressing and blowing glass in a mold (not shown) to form an annular glass wall 11 defining on its interior surface 12 a paraboloid of revolution generated about a central axis which is the focal axis for surface 12. This surface 12 may be in the form of parabolic segments joined together about the central focal axis. This surface of whichever of such forms is herein called a "parabolic surface". At the one end of the glass body wall 11 is a large end opening defined by the peripheral edge 13. An outwardly projecting peripheral flange 14 depends from edge 13 which encircles the collector body 10. Along the axis at the apex of the parabolic surface 12 there is a tubular wall extension which is the yoke portion 15 of the glass body. The one end 15a of yoke 15 is integral with the glass wall of the parabolic portion and defines an aperture 16 concentrically disposed about the focal axis of the parabolic surface 12. The outer open end 17 of yoke 15 provides the means by which the collector is connected onto a manifold system, to be hereinafter described.

The glass body 10, just described, is treated to receive a thin specular coating 18 of silver, or the like, over the parabolic surface 12 to form a specular mirror finish throughout the parabolic surface to the aperture 16.

The absorber member 19 comprises a hollow, enlarged, substantially spherical, bulbous end portion 20 from which there depends a hollow, substantially cylindrical stem portion 21. The absorber member 19 may be blow molded from glass and annealed, or otherwise heat treated, to provide sufficient strength in the unit to withstand and hold the pressure differentials in the collector which is under vacuum after the absorber is installed in the collector body 10. The outer end of stem 21 is open and may include an outwardly flared portion 21a adjacent the end. The O.D. of flared portion 21a is approximately the same as the I.D. of the open end 17 of yoke 15. In assembly of the absorber 19 in yoke 15, the flared portion 21a of the absorber stem is fused by a glass-to-glass seal thereof in the end 17 of the yoke.

Additionally, before assembly, the absorber stem 21 may be worked upon heating the glass to the softening point or higher such that an annular rib-like enlargement 22 is formed along the stem length; the rib 22 having an O.D. that is the same as or slightly larger than the diameter of aperture 16 in the glass wall 11. The absorber member 19 also includes a coating layer or layers 23 of an energy absorbing coating which extends at least over the bulbous end 20 and a part of stem 21 disposed above aperture 16. Thus, a coating 23 is applied beginning at about rib 22 upwardly over stem 21 and all of the exposed exterior surface of bulb-shaped end portion 20.

The coating 23 takes the form of a highly efficient solar energy absorbing coating, e.g. a wave length selective coating. The glass absorber member 19 with the coating 23 thereon comprises the means by which radiation of the sun is absorbed by the collector. The absorber 19 will be disposed axially (vertically) in the unit with its central axis generally aimed at the sun. The absorber is of a smaller surface area compared to the relatively large surface area of the parabolic reflector surface 12. This contributes greatly to a minimal radiation heat loss from the unit by having the absorber of the smaller surface area. The highly efficient coating 23 on the absorber tube further reduces radiation losses and retains the energy on the absorber member 19. The bulb collector unit is highly efficient for collection of the energy of the sun's rays. Circulation of working media through the interior of the absorber tube, such as described hereinafter, exchanges the absorbed heat of the sun's energy which is carried by the media. The wave length selective coatings should have the property of very high absorption (preferably more than 0.8 absorption in wave lengths above 2.5 microns) and very low emission (preferably less than 0.1 emission in the infra-red wave lengths, less than 2.5 microns).

The coated absorber member 19, just described is assembled along the central axis of the body 10 (focal axis of surface 12). In assembling the collector shown on FIGS. 1 and 3, the absorber 19 is inserted open end first past the large opening 13 of the glass wall reflector aperture 16 and into yoke 15. Flared end portion engages the inner wall surface of yoke 15 near the end thereof and the rib engages (or nearly so) the glass of wall 11 adjacent the perimeter of aperture 16. Glass of the flared end may be (preferably) fused with the glass of the yoke wall adjacent open end 17. The glass in rib 22 is similarly (preferably) fused with the glass of wall 11 around aperture 16. The solar absorber element 19 is now connected in place in the collector bulb assembly.

A face plate or cover plate 25 is formed of transparent glass and includes a circular outwardly domed section 26, and an integral peripheral flange 27. The perimeter of inner edge 28 of the domed section of the face plate approximately matches the circular edge 13 on the bulb body, and the flange 27 overlies the peripheral flange 14 thereof. Inasmuch as the bulb interior is under vacuum, the convex cover plate adds strength to the assembly. However, a flat cover plate may be used with success.

Figure 3:
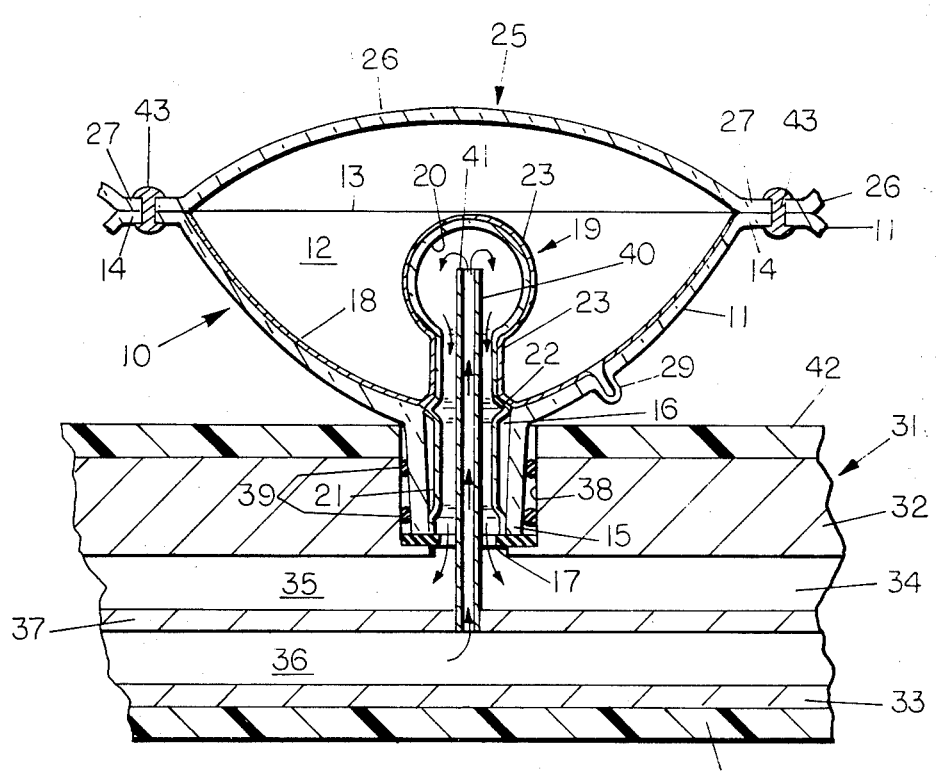
FIG. 3 is a sectional elevational view of the collector apparatus of FIG. 1, installed as a series of the collectors on a manifold.

As seen on FIGS. 1 and 3, a tubulation 29 is formed on the glass wall 11 of the bulb which includes an aperture 30. The bulb and face plate are now assembled and securely fastened or joined together at the matched flanges 14, 27. This is most conveniently done by fusion of the two flanges of glass. The interior space or chamber within the bulb is next evacuated by connecting a vacuum pump at tubulation 29 and combined with a bake out the interior of the bulb collector is drawn down to a vacuum of $10^{-4}$ torr or more; whereupon, tubulation 29 is tipped off and sealed in the known manner (see bulb 10 on FIG. 3). The vacuum chamber within the bulb collector reduces the convection and conduction of heat losses of the unit.

As shown in FIG. 3, several of the bulb collectors 10 may be assembled onto a manifold connected in a system for circulating a working medium, i.e. gas or liquid.

THE MANIFOLD

The manifold 31 is shown connected with an array of collector bulbs 10. Working media, such as water, is circulated from the manifold into each of the bulbs so that the bulbs are serviced in a parallel arrangement. Although a liquid media (water) is suggested for use with this arrangement, a gaseous media, such as air, may be substituted.

The manifold 31 is comprised of a top wall 32 and bottom wall 33 and opposed side walls 34 which define a conduit that is divided longitudinally into upper and lower passageways 35 and 36 respectively, by a central wall 37 extending sidewise of the conduit from opposite side walls 33. The aperture 38 in wall 32 receives the yoke 15 of a bulb collector which is sealed in the manifold by a pair of O-ring gaskets 39. Working media is connected from the lower passageway 36 into the interior chamber of the absorber element 19 by a delivery tube 40 which has its upper open end 41 spaced from the top of the bulbous end 20 of the absorber. Flow of the working media is shown by the arrows on FIG. 3 in which cooler media flows from passage 36 into the absorber and exchanges heat with the glass wall thereof in the bulb shaped end 20. The heated media returns to passageway 35.

Manifold 31 also includes a complete exterior layer 42 of sufficient thickness of an insulation, such as a foamed (cellular) polyurethane or the like. Preferably, the exposed exterior of insulation layer 42 is coated or painted with a sealer, such as a plastic or paint, to close any cellular structure and provide a more durable exterior to the unit.

As may be seen, for example as illustrated by the ray lines on FIG. 3, the sun's rays pass through the face plate and strike either the energy absorbing surface 23 of the absorber tube or strike the mirror surface 18 of the parabolic reflector 12. The rays impinging upon the mirror surface of the parabolic reflector are reflected to the focal axis of parabolic surface 12 whereat they strike the coated outer surface of the bulbar absorber. The vacuum in the space inside the bulb prevents loss of energy from convection and conduction.

As shown on FIG. 3, the bulb collectors may be peripherally joined as a curtain wall installation that affords resistance to weather and the like. The several bulb collectors may be placed in side-by-side arrangements with their sealed together flanges 14, 27 abutting one another. A suitable grouting compound or cement 43 is forced in the seams around the flanges sealing the exposed plane of the collectors from leakage, which produces run off of snow and rain or the like to keep the curtain wall from sun masking obstructions, etc.

Having illustrated and described several embodiments of the invention herein, it should be understood that further modifications may be resorted to without departing from the spirit of the invention and scope of the appended claims.

What is claimed is:

1. A solar collector apparatus comprising an integral endless glass wall defining a parabolic surface disposed about a central focal axis, an aperture at one end of said wall centered on said axis at the apex of said parabolic surface, the opposite end of said wall defining an enlarged open end,
   a continuous reflective coating layer over the parabolic surface of said wall for reflecting solar radiation striking said surface to said focal axis,
   a hollow glass absorber member comprised of an enlarged bulbar end portion and an integral tubular stem portion depending therefrom that is open at one end, the stem of said member being inserted through said aperture and coaxial with said focal axis such that the open end thereof is disposed outside of said parabolic surface and adjacent the apex aperture,
   fusion connecting means sealingly attaching said glass absorber member integrally with said parabolic glass wall at the apex aperture region thereof such that the bulbar end portion is disposed along said focal axis and within said parabolic surface,
   said glass absorber member including an energy absorbing surface thereon extending over the surface area of the bulbar end portion thereof,
   a transparent glass cover member for covering the open end of said parabolic wall opposite the aperture thereof, and
   means for sealingly connecting the glass cover plate over said parabolic glass wall closing the parabolic chamber defined thereby, said chamber being evacuated to at least a partial vacuum.

2. The solar collector apparatus of claim 1, wherein the fusion connecting means for attaching the glass absorber member in said apex aperture comprises a glass-to-glass seal between said tubular stem portion thereof and the said glass wall.

3. The solar collector apparatus of claim 1, wherein the said reflective coating on the parabolic surface of said glass wall comprises a specular reflective surface.

4. The solar collector apparatus of claim 1, wherein the energy absorbing surface on said glass absorber member is disposed over the exterior surface of said member that is disposed within the parabolic surface, said energy absorbing surface being enclosed in the vacuum chamber of the collector.

5. The solar collector apparatus of claim 4, wherein said energy absorbing surface comprises a wave length selective coating on the exterior surface of said absorber member.

6. The solar collector apparatus of claim 5, in which said wave length selective coating is characterized by having the properties of more than 0.8 absorption in wave lengths above 2.5 microns and less than 0.1 emission in wave lengths of 2.5 microns and less.

7. The solar collector apparatus of claim 1, including
   a manifold providing a conduit for flow of working fluid, said manifold including means for sealingly connecting said tubular stem portion of the absorber member to the manifold whereby the open end of the hollow absorber member is in communication with said conduit, and
   means for introducing working fluid from the manifold conduit internally of the absorber member in heat exchange relation therewith and returning the solar energy laden working fluid to said manifold conduit.

8. The solar collector apparatus of claim 7, wherein the means for introducing working fluid from the manifold into said absorber member comprises a longitudinal wall means dividing the manifold conduit into two passageways, an aperture in the manifold connected to one of the passageways, the said means sealingly connecting the open end of said tubular stem portion of the absorber member to the manifold at said manifold aperture, a delivery tube disposed in said tubular stem portion and connected to the other of the passageways, said delivery tube extending internally of said absorber member and spaced from the bulbar end thereof, whereby flow of working fluid in the other of the passageways of the manifold is conducted through said delivery tube into and through the interior of said bulbar absorber member and into the one passageway of the manifold, the working fluid being heated while in the absorber member.

9. The solar collector apparatus of claim 8, in which the working fluid is a gas.

10. The solar collector apparatus of claim 8, in which the working fluid is a liquid.

11. The solar collector apparatus of claim 8, including a layer of thermal insulating material encasing the manifold.

12. The solar collector apparatus of claim 1, wherein the glass tubular stem of the absorber member includes an annularly outwardly flared portion thereon of outside dimension at least equal to the inside dimension of the apex aperture, the glass of said flared portion being annularly fused with the glass of said glass wall around the apex aperture thereof sealingly attaching said stem.

* * * * *